Figure 2:
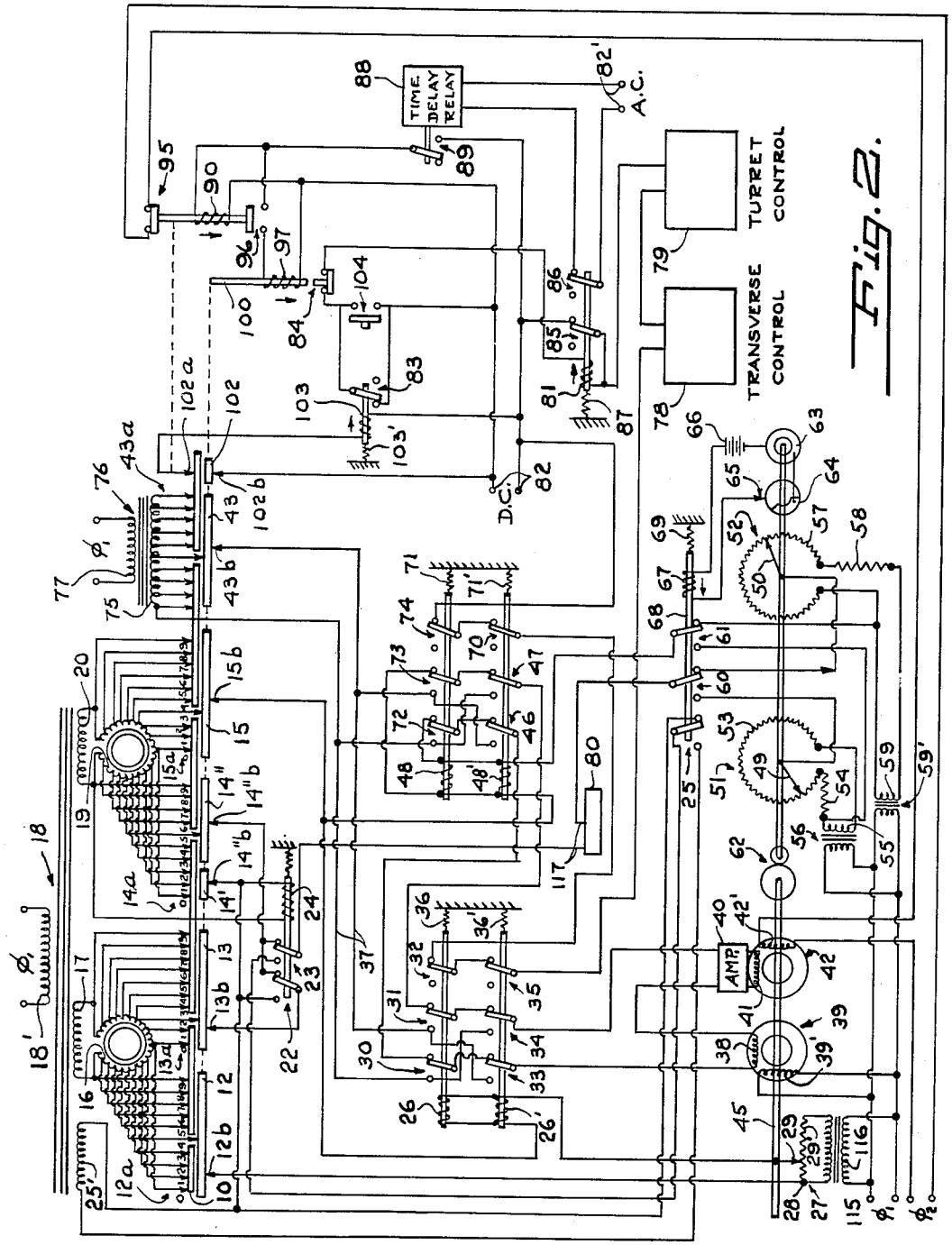

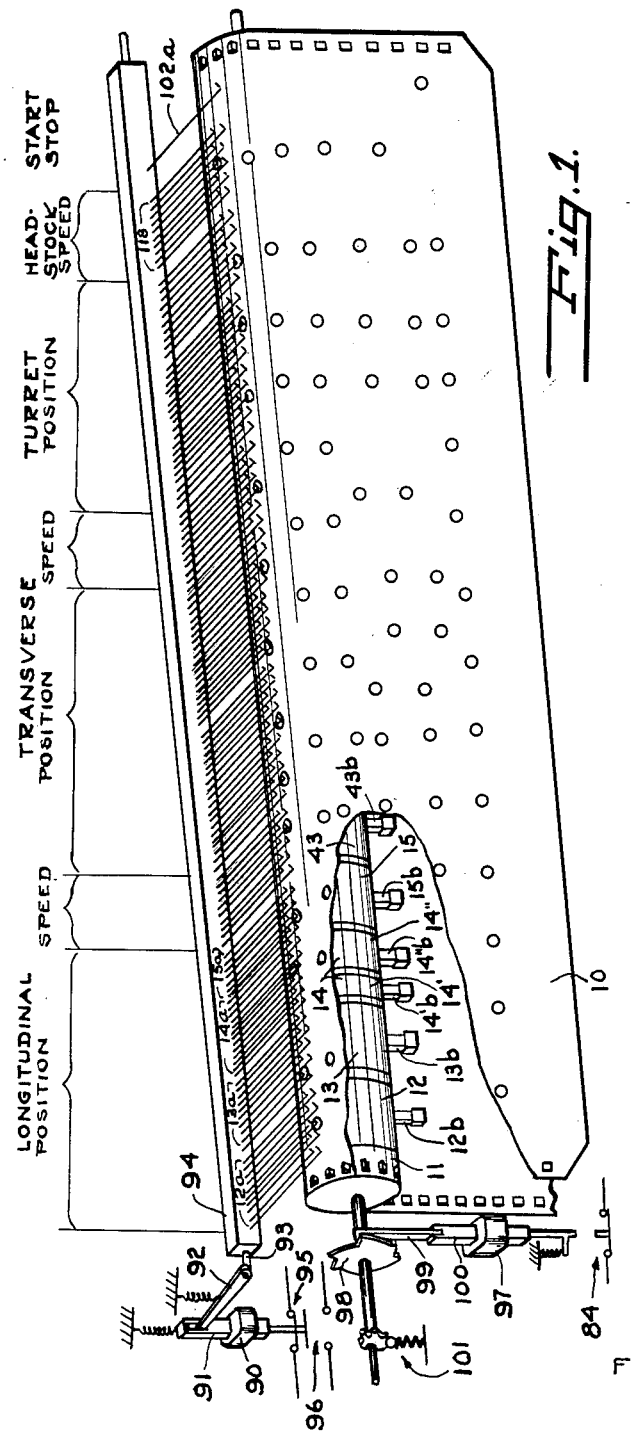
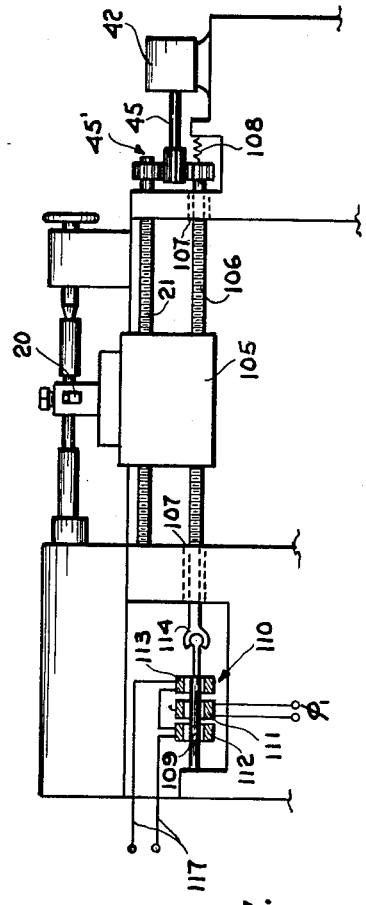

INVENTOR
FREDERICK W. CUNNINGHAM
ATTORNEY

United States Patent Office

2,741,732
Patented Apr. 10, 1956

2,741,732

MOTOR CONTROL SYSTEM FOR AUTOMATIC MACHINE TOOLS

Frederick W. Cunningham, Stamford, Conn., assignor to American Bosch Arma Corporation, a corporation of New York Application August 2, 1951, Serial No. 240,018

17 Claims. (Cl. 318—162)

The present invention relates to machine tools and has particular reference to means for automatically controlling the machine tools from a punched tape or the like.

When controlling an engine lathe for example, the holes in the tape correspond to the longitudinal, transverse and angular positions to which the tool is to be driven, and govern the speed with which the tool is driven to that desired position.

In the preferred embodiment the tape perforations allow predetermined contact fingers to cooperate with contact drums thereby connecting certain transformer windings in series to produce voltages proportional in magnitude to the desired displacement of the tool from the defined zero position. This position signal is matched against the output of a potentiometer whose movable element is driven by the tool drive motor, and the error or difference voltage is applied to polarized relay windings which actuate one or another set of switches depending on the direction in which the tool is to be driven. The motor is energized by a constant voltage supply, the magnitude of which is controlled by a perforation in the tape, driving the tool towards the desired position at a constant rate. When the tool is very nearly in the correct position the motor control is transferred to the error signal, so that the motor continues to drive the tool, and the potentiometer movable element, until the error voltage is exactly zero and the tool is correctly positioned.

For additional accuracy coarse and fine position control potentiometers are utilized, and a lost-motion-compensator is installed to compensate for backlash in the drive screw.

Automatic machine tools have been built previously wherein the tool position is controlled by cams or electrical contacts, but these machines are difficult to readjust to perform new operations and are economically feasible only when a great number of like objects are to be made. With the present invention, however, even a small number of pieces may be made automatically, and the only adjustment required for new operations is to change the punched control tape. The present system may also be used to control more than one machine from a single punched tape.

For a more complete understanding of the present invention reference may be had to the accompanying diagrams, in which Fig. 1 is a pictorial view of the contact fingers, tape and their control mechanisms.

Fig. 2 is a schematic electrical wiring diagram of the longitudinal control of the lathe by the present invention, and Fig. 3 is a view of a lathe, showing the installation of the lost-motion-compensator.

With reference to Fig. 1, a portion of the punched tape 10 is torn away to reveal the roller 11 over which the tape 10 rides. The roller 11 consists of a plurality of separated electrical conducting drums, such as drums 12, 13, 14 which are shown in Fig. 1. As described later, the drum 14 is composed of two smaller drums designated as 14' and 14". Mounted above the roller 11 are groups of ten contacting fingers 12a, 13a, 14a and so on which correspond to the drums 12, 13, 14 etc. on the roller 11. Contacting the under side of the drums 12, 13, 14 are the respective stationary takeoff brushes 12b, 13b, 14'b and 14"b.

The four groups of ten fingers 12a, 13a, 14a and 15a at the left of Fig. 1 represent the four places in the longitudinal dimension of the position of the tool from a defined zero position, i. e. 12a represents inches, 13a represents tenths of inches, 14a hundredths of inches and 15a thousandths of inches. The location of the holes punched in tape 10 determine which one of the ten fingers of each group contacts the corresponding drum on roller 11.

Referring now to the schematic wiring diagram of Fig. 2, the fingers 12a and 13a are connected to various taps on the auto transformer winding 16 which is energized by the secondary winding 17 of transformer 18, the primary winding 18' of which is energized by $\phi_1$ while the fingers 14a and 15a are connected to taps on the auto transformer winding 19 which is energized by the secondary winding 20 of transformer 18. The voltage between any two adjacent fingers 12a is ten times as great as the voltage between any two adjacent fingers 13a, one hundred times as great as the voltage between any two adjacent fingers 14a, and one thousand times as great as the voltage between any two adjacent fingers 15a. The fingers 12a and 13a which correspond to zero are connected to the same tap on winding 16, while the fingers 12a and 13a corresponding to nine are connected to the extremities of the winding 16. Similarly the fingers 14a and 15a corresponding to zero are connected to the same tap on winding 19 while the fingers corresponding to nine are connected to the extremities of the winding 19.

Assume now that in a particular lathe operation the tool 20 (Fig. 3) of the lathe is to be driven longitudinally to a point located 4.253 inches from the defined index by the lead screw 21. Holes are punched in the tape 10 such that the finger 12a which corresponds to the dimension 4" contacts the cylinder 12, the finger 13a which corresponds to the dimension 0.2" contacts the cylinder 13, the finger 14a which corresponds to the dimension 0.05" contacts the cylinder 14" and the finger 15a which corresponds to the dimension 0.003" contacts cylinder 15.

The movable contacts of switches 22 and 23, operated by relay winding 24, are urged to the right by spring 24' and positioned as shown in Fig. 2 since the winding 24, connected between brush 14'b and one extremity of winding 19, is deenergized. It is only when a finger 14a corresponding to 0, 1, or 2 contacts the cylinder 14' that relay winding 24 is energized, while at any other time the relay winding 24 is deenergized for reasons to be explained.

The right hand stationary contacts of switches 22 and 23 are connected to brush 14"b while the left hand stationary contact of switch 22 is connected to brush 14'b and also to the right hand stationary contact of switch 25. The movable contact of switch 22 is connected to brush 13b, while the movable contact of switch 25 is connected to the left hand stationary contact of switch 23. The secondary winding 25' of transformer 18 is connected across the stationary contacts of switch 25.

It will be seen that the voltage between brushes 12b and 15b is proportional in magnitude to the desired longitudinal dimension (4.253") by tracing the circuit from brush 12b to 15b as follows: From brush 12b through drum 12, finger 12a, transformer winding 16, finger 13a, drum 13, brush 13b, switch 22, brush 14"b, drum 14", finger 14a, transformer winding 19, finger 15a, drum 15 and brush 15b.

Brushes 12b and 15b are connected in series with polarized relay windings 26 and 26' and with the output circuit of potentiometer 27 (between end terminal 28 of resistor 29' and the movable brush 29), so that the voltage energizing relay windings 26 and 26' is the error or difference voltage between the voltage across brushes 12b and 15b and the voltage output of potentiometer 27. Resistance winding 29' is energized by the output of transformer 115, the primary winding 116 of which is connected to $\phi_1$.

The relay windings 26 and 26' are such that when the error voltage is zero, or nearly so, the movable contacts of switches 30, 31, 32, 33, 34 and 35 are all drawn to the right by the springs 36 and 36'. When the voltage output of potentiometer 27 is greater in magnitude than the voltage between brushes 12b and 15b, relay winding 26 draws the movable contacts of switches 30, 31 and 32 to the left and the switches 33, 34, and 35 remain in the right hand position, while for the opposite relationship between the voltages the switches 30, 31 and 32 remain as in Fig. 2 and the movable contacts of switches 33, 34 and 35 are drawn to the left by relay winding 26'.

The left hand stationary contacts of switches 30 and 31 are connected to the leads 37, and the left hand stationary contacts of switches 33 and 34 are also connected to leads 37, but in reverse phase. The movable contacts of switches 30 and 31 are connected respectively to the right hand stationary contacts of switches 33 and 34, and the movable contacts of switches 33 and 34 are connected in series with the output field winding 38 of linear induction generator 39 and the input terminals of amplifier 40. The control field winding 41 of motor 42 is connected to the output of amplifier 40 and is therefore energized by the amplified difference between the voltages at switches 33 and 34 and the output of output field winding 38.

The main field winding 39' of generator 39 is energized by $\phi_1$ of the A. C. supply, while the main field winding 42' of motor 42 is energized by $\phi_2$ through switch 95. Motor 42 therefore drives the rotor of generator 39 at a speed such that the output voltage of output winding 38 is very nearly equal to the voltage between switches 33 and 34, whence the speed and direction of motor 42 is determined by the voltage between switches 33 and 34. The speed at which the tool makes a cut is therefore determined by the voltage across leads 37, and is controlled by the tape 10. The fifth group of ten fingers 43a is positioned over a contacting drum 43 on roller 11 with which brush 43b cooperates. One lead 37 is connected to brush 43b, the other lead 37 is connected to one end of secondary winding 75 of transformer 76, the primary winding 77 of which is energized by $\phi_1$. Various taps on secondary winding 75 are electrically connected to the fingers 43a, and a selected tap is connected to the brush 43b as the corresponding finger 43a is allowed to cooperate with the drum 43 by a hole in tape 10.

As long as either relay winding 26 or 26' actuates its associated switches to the left, motor 42 is energized by the constant voltage across leads 37, and therefore drives the shaft 45 and movable contact 29 of potentiometer 27 at a constant speed in the direction tending to deenergize the relay windings 26 and 26'. When the attractive force of relay windings 26 and 26' is decreased sufficiently to allow the associated switches to be drawn to the right by springs 36, 36' the control of motor 42 is transferred to the switches 46 and 47 since the right hand stationary contacts of switches 30, 31 are connected to the movable contacts of switches 46 and 47. The angular displacement of shaft 45, which drives the lead screw 21 of the cutting tool 20, is proportional to the desired longitudinal displacement of the tool, very nearly, but is more accurately positioned by the signal from switches 46 and 47, as will be described.

Motor 42 also drives gearing 62 and thereby drives the movable brushes 49 and 50 of the potentiometers 51 and 52 respectively through one revolution for each 0.1 inch advance of the cutting tool 20. The resistance winding 53 of potentiometer 51 is connected in series with fixed resistor 54 across the secondary winding 55 of transformer 56, and the resistance winding 57 of potentiometer 52 is connected in series with fixed resistor 58 across the secondary winding 59 of transformer 59'. The primary windings of transformers 56 and 59' are connected to $\phi_1$ of the power supply. The output of potentiometer 51 taken between the movable brush 49 and that end of resistor 54 which is not connected to resistance winding 53, is connected to the left hand stationary contacts of the switches 60 and 61, while the output of potentiometer 52, taken between movable brush 50 and that end of resistance winding 57 which is not connected to resistor 58, is connected to the right hand stationary contacts of the switches 60 and 61.

The magnitude of the output voltage of potentiometer 52 corresponds to hundredths and thousandths of an inch of the movement of the tool and varies between values proportional to .000 inch and 0.100 inch, according to the angular displacement of brush 50. The magnitude of the output voltage of potentiometer 51 also corresponds to the hundredths and thousandths of an inch of movement of the tool, but varies between values proportional to 0.050 inch and 0.150 inch according to the angular displacement of brush 49.

Slip ring 63 and the series connected angular contact 64 are driven with brushes 49 and 50 by gearing 62. When brush 65 cooperates with contact 64 a series circuit is completed from power supply 66 through relay winding 67 so that the movable contacts of the switches 25, 60 and 61 are drawn to the left by the armature 68 against the action of spring 69. Preferably, angular contact 64 covers about 180°, and is so positioned with respect to brushes 49 and 50 that with brush 49 in the center of resistance winding 53, brush 65 is in the center of the contact 64 while the brush 50 is 180° away or near one end of resistance winding 57. Thus, when the brush 50 is near the center of its resistance winding 57, i. e. between the one-quarter and three-quarter points, the output of potentiometer 52 is applied to the movable contacts of switches 60 and 61 and when the brush 49 is located between the one-quarter and three-quarter points of the resistance winding 53 the output of potentiometer 51 is applied to the movable contacts of switches 60 and 61.

The movable contacts of switches 60 and 61 are connected in series with the parallel connected polarized relay windings 48 and 48', brush 15b, movable contact of switch 23 and the output of the lost-motion-compensator 80, which is described in a later portion of this specification. For the moment it may be considered that the lost-motion-compensator output is zero, so that the error or difference voltage between the voltage across the movable contacts of switches 60 and 61, and the voltage across brush 15b and the movable contact of switch 23 energizes the polarized relay windings 48 and 48'.

For the conditions in Fig. 2, the voltage between brush 15b and the movable contact of switch 23 is the voltage between brushes 14"b and 15b or is proportional in magnitude to the hundredths and thousandths of an inch in the desired longitudinal dimension (.053").

When the voltage output of switches 60 and 61 is greater in magnitude than the position signal from brush 15b and switch 23, relay winding 48' urges the movable contacts of switches 46, 47 and 70 to the left against the action of spring 71', while switches 72, 73 and 74 remain as in Fig. 2, and for the opposite relationship between the voltages, relay winding 48 urges the movable contact of switches 72, 73 and 74 to the left against the action of spring 71 while the movable contacts of switches 46, 47 and 70 are urged to the right, as in Fig. 2.

The leads 37 are connected to the left hand stationary contacts of switches 72 and 73 and also, in opposite phase, to the left hand stationary contacts of switches 46 and 47. The movable contacts of switches 72 and 73 are connected to the right-hand stationary contacts of switches 46 and 47 respectively, and the right hand stationary contacts of switches 72 and 73 are connected across the relay windings 48 and 48'.

Thus, when the control of motor 42 is transferred from the coarse control of potentiometer 27 to the fine control of potentiometer 52, motor 42 drives shaft 45 until the output of the potentiometer 52 very nearly matches the position voltage between brush 15b and switch 23 and attractive force of relay windings 48 or 48' is weakened so that swiches 72, 73, 46 and 47 assume the position shown in Fig. 2. Motor 42 then continues to drive shaft 45 until the voltage energizing the relay windings 48 and 48' and applied to the right hand stationary contacts of switches 72 and 73, is zero so that the angular displacement of shaft 45 corresponds to the desired dimension (4.253").

In the event that the second figure to the right of the decimal point in the desired dimension is 8, 9, 0, 1 or 2, the position of brush 50 on resistance winding 57 may, when the control of motor 42 is transferred to switches 46 and 47, be such that it should be driven through zero to match the voltage between brush 15b and the movable contact of switch 23. Under these conditions the brush 50 may be driven in the wrong direction and for this reason the potentiometer 51, switches 22, 23, 25, 60 and 61 and secondary winding 25' of transformer 18 are provided.

Whenever the position of brush 50 of potentiometer 52 corresponds to a "hundredths" dimension of 8, 9, 0, 1 or 2 relay winding 67 is energized as the circuit through the winding 67 is completed from power supply 66 through the segmental contact 64 and slip ring 63, thereby drawing the movable contacts of switches 25, 60 and 61 to the left. Closure of switches 60 and 61 to the left applies the output of potentiometer 51 to the movable contacts of switches 60 and 61, so that relays 48 and 48' are controlled by the potentiometer 51. Closing of switch 25 to the left adds a voltage proportional to 0.1" between the left-hand stationary contact of switch 23 and the brush 14'b.

It will be seen that when the finger 14a corresponding to 0, 1 or 2 cooperates with drum 14', so that switches 22 and 23 are urged to the left by relay 24, the voltage between the movable contact of switch 23 and brush 15b corresponds to a dimension 0.1" greater than the hundredths and thousandths of inches in the given dimension whenever shaft 45 is positioned so that relay winding 67 is energized and potentiometer 51 is in control of motor 42, while the voltage between the movable contact of switch 23 and brush 15b corresponds to the hundredths and thousandths of inches of the given dimension whenever relay winding 67 is deenergized and potentiometer 52 is in control of motor 42. Also, when any other finger 14a cooperates with drum 14" the voltage between brush 15b and the movable contact of switch 23 corresponds to the hundredths and thousandths inches of the given dimension.

It follows that whenever the given dimension is such that the "hundredths" value is 8, 9, 0, 1 or 2 the potentiometer 51 controls the final position of the shaft 45, and whenever the hundredths value is 3, 4, 5, 6 or 7 the final position of shaft 45 is determined by potentiometer 52.

When the tool reaches the end of its cut the tape 10 is advanced to a new position, as will be described, so that a new set of holes under the contact fingers describes the succeeding motion of the tool.

Switches 32, 35, 70 and 74, controlled by the polarized relays, are electrically connected in series when the tool is at the desired position, i. e. when the relay windings 26, 26', 48 and 48' are deenergized and the movable contacts of the switches 32, 35, 70 and 74 cooperate with their respective right-hand stationary contacts. Switches 32, 35, 70 and 74 are also connected in series with similar switches in the transverse control box 78 and in the turret control box 79 and with relay winding 81, switches 84 and 83 and power supply 82 so that relay winding 81 is energized when the tool reaches the position determined by the holes in tape 10.

Energization of relay winding 81 urges the movable contacts of switches 85 and 86 to the right against the action of spring 87. Closure of switch 85 to the right maintains the relay winding 81 in the energized condition even though switches 32, 35, 70 and 74 open during the following operations while switch 86 energizes the time delay relay 88 from power supply 82'. The time delay relay 88 is provided to allow motor 42 time to completely deenergize relay windings 48 and 48' when the positional error signal controls motor 42 as previously explained. After a few seconds the relay 88 closes switch 89 to the right to energize the finger lifter solenoid 90 from power supply 82. The energized solenoid 90 attracts the armature 91 (Fig. 1) pulling lever 92 downward at the rear and rotating the shaft 93 carrying the contact support 94, thereby raising the contact fingers 12a, 13a etc. from the tape 10. At the start of the finger lifting operation switch 95 is opened by the initial movement of armature 91, to disable motor 42 by deenergizing the main field winding 45, and at the conclusion of the finger lifting stroke switch 96 is closed by the armature 91 to energize the drum drive solenoid 97, from power supply 82.

The drum drive mechanism may be of any desired construction but is shown in Fig. 1 simply as a ratchet 98 connected to roller 11, pawl 99 actuated by the armature 100 of solenoid 97, and detent device 101 which aids in positioning the roller 11. As the roller 11 is advanced, the armature 100 causes switch 84 to be opened thereby deenergizing relay winding 81. Switches 85 and 86 are therefore opened deenergizing relay 88 and consequently deenergizing solenoid windings 90 and 97 thereby returning switches 89, 95, 96 and 84 to the position shown in Fig. 2.

Fingers 12a, 13a, etc. are lowered, motor 42 is energized and the tool is moved to a new position or makes a new cut in the work piece as dictated by the holes in the tape 10.

After the last operation is completed, finger 102a contacts the drum 102 through a perforation in tape 10 thereby completing a circuit from power supply 82 through brush 102b, contact 102a and relay winding 103 to energize winding 103 and open switch 83 against the action of spring 103' so that tape 10 is not advanced further and the machine comes to rest. At the beginning of operations relay winding 103 is similarly energized so that push button 104 must be depressed to complete the circuit through relay winding 81 to initiate the action of the lathe.

For more accurate results in positioning the tool 20, the lathe is equipped with the lost-motion-compensator 80 which will be described with reference to Fig. 3.

The lost-motion-compensator is a means of electrically compensating for the backlash between the lead screw 21 and the tool 20.

The tool 20 is driven by means of the lead screw 21 which is threaded in the carriage 105 and is driven by shaft 45 of motor 42. Gearing 45' causes lead screw 21 to drive a similar screw 106 which is also threaded in carriage 105 but is free to slide longitudinally within its bearings 107 and is always urged to the right by spring 108. The left hand end of screw 106 carries a ball and knuckle joint 114 to which is connected the armature 109 of the linear pickup device 110.

It is evident that with any appreciable backlash between the drive screw 21 and carriage 105 the position of tool 20 cannot be accurately determined by the angular displacement of screw 21. Also, it should be noted that with screw 106 always urged to the right by spring 108, the screw 106 will experience longitudinal displacement during the lost motion period of screw 21. Thus the position of tool 20 is accurately determinable from the angular displacement plus the longitudinal displacement of screw 106, and conversely the error in the position of tool 20 as determined from angular displacement of screw 21 alone is equal to the longitudinal displacement of screw 106. The pickup device 110 is preferably of the differential transformer type where the primary winding 111 is energized by $\phi$, and the secondary windings 112 and 113 are connected in series opposition so that the magnitude of the voltage across the output leads 117 is proportional to the longitudinal displacement of the armature 109 from the defined zero position. Leads 117 are connected in series between the movable contacts of switches 23 and 69, of Fig. 2. Thus, when the polarized relay windings 48 and 48' are deenergized, the position signal between brush 15b and switch 23 is matched against the sum of the voltage output of potentiometer 51 or 52 and output of lost-motion-compensator 80, so that the position of the tool 20 when the relays 48 and 48' are deenergized is proportional to the sum of the angular displacement of screw 21 plus the longitudinal displacement of screw 106.

Although this specification has described the automatic tool control with reference to an engine lathe, the invention is not to be restricted to such use but may be applied with equal facility to other machine tools, such as milling machines and jigborers, for example. Also, the headstock speed is preferably controlled by the tape 10, using any well known device where the speed of the headstock motor is dependent on the magnitude of the control voltage, and the control voltage is varied by the contact fingers 118 in a manner similar to the action of contact fingers 43a in controlling the voltage across leads 37.

I claim:

1. In a device of the character described, a machine tool, an automatic control means for said machine tool, said control means including motor means for actuating said machine tool, transformer means having a plurality of windings and connected to said motor means for actuating said motor means, an intermittently driven tape having openings therein corresponding to the positions to which the tool or work is to be driven and contact means on the opposite sides of said tape and adapted to contact through said openings to connect certain of said transformer windings in series to produce voltages proportional in magnitude to the desired relative position between the work and tool and means for producing an error voltage equal to the difference between the position of the tool and the desired position of the tool and means controlled by said error voltage for applying constant voltage to said motor and thereby control the operation of said machine tool on said work and means for advancing said tape at the conclusion of each operation.

2. In a device of the character described, a machine tool, an automatic control means for said machine tool, said control means including motor means for actuating said machine tool, transformer means having a plurality of windings and connected to said motor means for actuating said motor means, an intermittently driven tape having openings therein corresponding to the positions to which the tool or work is to be driven and contact means on the opposite sides of said tape and adapted to contact through said openings to connect certain transformer windings in series to produce voltages proportional in magnitude to the desired relative position between the work and tool, a potentiometer whose movable element is driven by said motor, said potentiometer being connected in series with said transformer windings, said motor being energized by a constant voltage supply and a voltage equal to the error or difference in voltage between the potentiometer output and the voltages produced by said transformer windings, said voltage being applied to relay windings to actuate switches and thereby control the operation of said machine tool on said work and means for advancing said tape at the conclusion of each operation.

3. In a device of the character described, a machine tool, an automatic control means for said machine tool, said control means including motor means for actuating said machine tool, transformer means having a plurality of windings and connected to said motor means for actuating said motor means, an intermittently driven tape having openings therein corresponding to the positions to which the tool or work is to be driven and contact means on opposite sides of said tape and adapted to contact through said openings and thereby connect certain transformer windings in series to produce voltages proportional in magnitude to the desired relative position between the work and tool, a potentiometer connected in series with said transformer windings and energized by a constant voltage supply and a voltage equal to the error or difference in voltage between the potentiometer output and the voltages produced by said transformer windings, said voltage being applied to relay windings to actuate switches and thereby control the operation of said machine tool on said work, said contact means comprising contact drums on one side of said tape and contact fingers on the other side thereof and adapted to engage said drums through said openings and means for advancing said tape at the conclusion of each operation.

4. In a device of the character described, a machine tool for performing an operation upon a workpiece, automatic control means for controlling the operation of said machine tool on said workpiece, said control means comprising, a tape having means for controlling the positions to which the tool or work is to be driven, motor means for driving said tool or work, a motor energizing circuit, electrical means for producing voltages proportional to the desired displacement from a reference point of the work or tool, a potentiometer operatively connected to said motor means, means for matching the output of said electrical means with the output of said potentiometer, and means for controlling said motor energizing circuit in accordance with the difference between said voltage produced by said electrical means and the output of said potentiometer.

5. In a device of the character described, a machine tool for performing an operation upon a workpiece, automatic control means for controlling the operation of said machine tool on said workpiece, said control means comprising, a tape having means for controlling the positions to which the tool or work is to be driven, motor means for driving said tool or work, a motor energizing circuit, electrical means for producing voltage proportional to the desired displacement from a reference point of the work or tool, a potentiometer operatively connected to said motor means, means for matching the output of said electrical means with the output of said potentiometer, and means for controlling said motor energizing circuit so that when the difference between said output of said electrical means and the output of said potentiometer is substantial said motor is energized by a constant voltage whose polarity corresponds to the polarity of the error voltage and the magnitude of which is controlled by said tape and when said error voltage is relatively small for controlling said motor means directly by said error voltage.

6. In a device of the character described, a machine tool for performing an operation upon a workpiece, automatic control means for controlling the operation of said machine tool on said workpiece, said control means comprising, a tape having means for controlling the positions to which the tool or work is to be driven, motor means for driving said tool or work, a motor energizing circuit, electrical means for producing voltages proportional to the desired displacement from a reference point of the work or tool, a potentiometer operatively connected to said motor means, means for matching the output of said electrical means with the output of said potentiometer, and means for controlling said motor energizing circuit in accordance with the difference between said voltage produced by said electrical means and the output of said potentiometer, and means for intermittently advancing said tape.

7. In a device of the character described, a machine tool for performing an operation upon a workpiece, automatic control means for controlling the operation of said machine tool on said workpiece, said control means comprising, a tape having means for controlling the positions to which the tool or work is to be driven, motor means for driving said tool or work, a motor energizing circuit, electrical means for producing voltages proportional to the desired displacement from a reference point of the work or tool, a potentiometer operatively connected to said motor means, means for matching the output of said electrical means with the output of said potentiometer, and means for controlling said motor energizing circuit in accordance with the difference between said voltage produced by said electrical means and the output of said potentiometer, and means for intermittently advancing said tape, said means comprising, solenoid actuated pawl and ratchet means.

8. In a device of the character described, a machine tool for performing an operation upon a workpiece, automatic control means for controlling the operation of said machine tool on said workpiece, said control means comprising, a tape having means for controlling the positions to which the tool or work is to be driven, motor means for driving said tool or work, a motor energizing circuit, electrical means for producing voltages proportional to the desired displacement from a reference point of the work or tool, a potentiometer operatively connected to said motor means, means for matching the output of said electrical means with the output of said potentiometer, and means for controlling said motor energizing circuit in accordance with the difference between said voltage produced by said electrical means and the output of said potentiometer and means for intermittently advancing said tape comprising, a drum engaging said tape and solenoid actuated pawl and ratchet means operatively connected to said drum for rotating the same.

9. In a device of the character described, a machine tool adapted to perform an operation upon a workpiece, automatic control means for controlling the operation of said machine tool on said workpiece, said control means comprising a tape having openings therethrough corresponding to the positions to which the tool or work is to be driven, a motor for driving said tool or work, a rotary drum on one side of said tape, resiliently urged contact fingers on the opposite side of said tape and adapted to extend through said openings in said tape and make electrical contact with said drum for energizing said motor, electrical means for producing voltages proportional to the desired displacement of the work or tool, a potentiometer operatively connected to said motor and means for matching the output of said electrical means with the output of said potentiometer and means for energizing said motor in accordance with the difference between said voltage produced by said electrical means and the output of said potentiometer.

10. In a device of the character described, a machine tool adapted to perform an operation upon a workpiece, automatic control means for controlling the operation of said machine tool on said workpiece, said control means comprising a tape having openings therethrough corresponding to the positions to which the tool or work is to be driven, a motor for driving said tool or work, a rotary drum on one side of said tape, resiliently urged contact fingers on the opposite side of said tape and adapted to extend through said openings in said tape and make electrical contact with said drum for energizing said motor, electrical means for producing voltages proportional to the desired displacement of the work or tool, a potentiometer operatively connected to said motor, said potentiometer having a movable element operatively connected to and adapted to be driven by said motor, and means for matching the output of said electrical means with the output of said potentiometer and means for energizing said motor in accordance with the difference between said voltage produced by said electrical means and the output of said potentiometer.

11. In a device of the character described, a machine tool adapted to perform an operation upon a workpiece, automatic control means for controlling the operation of said machine tool on said workpiece, said control means comprising a tape having openings therethrough corresponding to the positions to which the tool or work is to be driven, a motor for driving said tool or work, a rotary drum on one side of said tape, resiliently urged contact fingers on the opposite side of said tape and adapted to extend through said openings in said tape and make electrical contact with said drum for energizing said motor, electrical means for producing voltages proportional to the desired displacement of the work or tool, a potentiometer operatively connected to said motor and means for matching the output of said electrical means with the output of said potentiometer, means for controlling the direction of movement of said tool or work and second electrical means for actuating said control means in accordance with the difference between said voltages produced by said first electrical means and the output of said potentiometer.

12. In a device of the character described, a machine tool adapted to perform an operation upon a workpiece, automatic control means for controlling the operation of said machine tool on said workpiece, said control means comprising a tape having openings therethrough corresponding to the positions to which the tool or work is to be driven, a motor for driving said tool or work, a rotary drum on one side of said tape, resiliently urged contact fingers on the opposite side of said tape and adapted to extend through said openings in said tape and make electrical contact with said drum for energizing said motor, electrical means for producing voltages proportional to the desired displacement of the work or tool, a potentiometer operatively connected to said motor and means for matching the output of said electrical means with the output of said potentiometer and means for energizing said motor in accordance with the difference between said voltage produced by said electrical means and the output of said potentiometer and means for intermittently moving said drum to advance said tape.

13. In a device of the character described, a machine tool adapted to perform an operation upon a workpiece, automatic control means for controlling the operation of said machine tool on said workpiece, said control means comprising a tape having openings therethrough corresponding to the positions to which the tool or work is to be driven, a motor for driving said tool or work, a rotary drum on one side of said tape, resiliently urged contact fingers on the opposite side of said tape and adapted to extend through said openings in said tape and make electrical contact with said drum for energizing said motor, electrical means for producing voltages proportional to the desired displacement of the work or tool, a potentiometer operatively connected to said motor and means for matching the output of said electrical means with the output of said potentiometer and means for energizing said motor in accordance with the difference between said voltage produced by said electrical means and the output of said potentiometer and means for intermittently moving said drum to advance said tape, said means for advancing said tape comprising solenoid actuated pawl and ratchet means.

14. In a device of the character described, a machine tool adapted to perform an operation upon a workpiece, automatic control means for controlling the operation of said machine tool on said workpiece, said control means comprising a tape having openings therethrough corresponding to the positions to which the tool or work is to be driven, a motor for driving said tool or work, a rotary drum on one side of said tape, resiliently urged contact fingers on the opopsite side of said tape and adapted to extend through said openings in said tape and make electrical contact with said drum for energizing said motor, electrical means for producing voltages proportional to the desired displacement of the work or tool, a potentiometer operatively connected to said motor and means for matching the output of said electrical means with the output of said potentiometer, means for controlling the direction of movement of said tool or work and second electrical means for actuating said control means in accordance with the difference between said voltages produced by said first electrical means and the output of said potentiometer, said second electrical means comprising polarized relay windings.

15. In a device of the character described, a machine tool adapted to perform an operation upon a workpiece, automatic control means for controlling the operation of said machine tool on said workpiece, said control means comprising a tape having openings therethrough corresponding to the positions to which the tool or work is to be driven, a motor for driving said tool or work, a rotary drum on one side of said tape, resiliently urged contact fingers on the opposite side of said tape and adapted to extend through said openings in said tape and make electrical contact with said drum for energizing said motor, electrical means for producing voltages proportional to the desired displacement of the work or tool, a potentiometer operatively connected to said motor and means for matching the output of said electrical means with the output of said potentiometer, switch means for controlling the direction of movement of said tool or work and second electrical means for actuating said switch means in accordance with the difference between said voltages produced by said first electrical means and the output of said potentiometer.

16. In a device of the character described, a machine tool adapted to perform an operation upon a workpiece, automatic control means for controlling the operation of said machine tool on said workpiece, said control means comprising a tape having openings therethrough corresponding to the positions to which the tool or work is to be driven, a motor for driving said tool or work, a rotary drum on one side of said tape, resiliently urged contact fingers on the opposite side of said tape and adapted to extend through said openings in said tape and make electrical contact with said drum for energizing said motor, electrical means for producing voltages proportional to the desired displacement of the work or tool, a potentiometer operatively connected to said motor and means for matching the output of said electrical means with the output of said potentiometer, switch means for controlling the direction of movement of said tool or work and second electrical means for actuating said switch means in accordance with the difference between said voltages produced by said first electrical means and the output of said potentiometer, said second electrical means for actuating said switch means comprising polarized relay windings.

17. In a device of the character described, a machine tool including a lead screw, a carriage driven by said lead screw for adjusting the relative positions of the work and tool, a motor for actuating said lead screw, automatic control means for said machine tool, said control means comprising an intermittently driven member having means corresponding to the relative positions to which the work or tool is to be driven, a motor energizing circuit, electrical means for producing voltages proportional to the desired displacement from a reference point of the work or tool, a potentiometer operatively connected to said motor means, means for matching the output of said electrical means with the output of said potentiometer, and means for controlling said motor energizing circuit in accordance with the difference between said voltage produced by said electrical means and the output of said potentiometer and means for electrically compensating for backlash in said lead screw, said compensating means including means connected to said carriage for measuring backlash in said lead screw and electrical means actuated by said measuring means for modifying said difference voltage in accordance with said backlash.

References Cited in the file of this patent

UNITED STATES PATENTS

| | | |
|---|---|---|
| 2,283,240 | Trinkle | May 19, 1942 |
| 2,439,891 | Hornfeck | Apr. 20, 1948 |
| 2,576,903 | Imm | Nov. 27, 1951 |
| 2,588,386 | Hubbard et al. | Mar. 11, 1952 |